US012589665B2

(12) United States Patent
Hair

(10) Patent No.: US 12,589,665 B2
(45) Date of Patent: Mar. 31, 2026

(54) PEER-TO-PEER DC FAST CHARGING

(71) Applicant: FORD GLOBAL TECHNOLOGIES, LLC, Dearborn, MI (US)

(72) Inventor: Jonathan Hair, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 681 days.

(21) Appl. No.: 17/988,005

(22) Filed: Nov. 16, 2022

(65) Prior Publication Data

US 2024/0157824 A1 May 16, 2024

(51) Int. Cl.
| | |
|---|---|
| *B60L 53/24* | (2019.01) |
| *B60L 50/61* | (2019.01) |
| *B60L 53/16* | (2019.01) |
| *B60L 53/22* | (2019.01) |
| *H02J 7/14* | (2006.01) |

(52) U.S. Cl.
CPC .............. *B60L 53/24* (2019.02); *B60L 50/61* (2019.02); *B60L 53/16* (2019.02); *B60L 53/22* (2019.02); *H02J 7/14* (2013.01); *B60L 2210/40* (2013.01); *H02J 2207/20* (2020.01)

(58) Field of Classification Search
CPC .......... B60L 53/24; B60L 50/61; B60L 53/16; B60L 53/22; B60L 2210/40; B60L 53/11; B60L 53/14; B60L 15/007; B60L 50/60; H02J 7/14; H02J 2207/20; H02J 2310/48; Y02T 10/70; Y02T 10/7072
USPC ........................................................ 320/109
See application file for complete search history.

(56) References Cited

U.S. PATENT DOCUMENTS

| | | | | |
|---|---|---|---|---|
| 7,256,516 | B2 * | 8/2007 | Buchanan ........... | H01M 10/441 |
| | | | | 307/62 |
| 9,290,105 | B2 * | 3/2016 | Zhao ..................... | H02J 7/0063 |
| 10,003,295 | B2 * | 6/2018 | Saha ......................... | H02P 6/14 |
| 11,077,760 | B2 | 8/2021 | Fong et al. | |
| 11,161,424 | B2 * | 11/2021 | Pfeilschifter ........... | B60L 53/18 |
| 12,139,024 | B2 * | 11/2024 | Slepchenkov ...... | H02J 7/00309 |
| 2004/0130292 | A1 * | 7/2004 | Buchanan ............... | B60L 53/20 |
| | | | | 320/116 |
| 2012/0286740 | A1 * | 11/2012 | Loudot ................. | H02M 7/217 |
| | | | | 320/137 |
| 2016/0121735 | A1 * | 5/2016 | Sugano ................... | H02J 7/342 |
| | | | | 320/109 |

(Continued)

FOREIGN PATENT DOCUMENTS

| | | | | |
|---|---|---|---|---|
| CA | 2997565 | A1 * | 3/2017 | ................ H02J 7/02 |
| WO | WO-2023043679 | A1 * | 3/2023 | .............. B60L 53/14 |

OTHER PUBLICATIONS

Subotic, Ivan, Nandor Bodo, and Emil Levi. "An EV drive-train with integrated fast charging capability." IEEE Transactions on Power Electronics 31.2 (2015): 1461-1471.

(Continued)

*Primary Examiner* — M Baye Diao
(74) *Attorney, Agent, or Firm* — David B. Kelley; Brooks Kushman P.C.

(57) ABSTRACT

Power systems capable of charging chargeable systems at a power greater than or equal to a predetermined value are disclosed. Example embodiments may be a power system for an electric vehicle. The chargeable system may be an electric vehicle. Some embodiments are capable of peer-to-peer fast charging of electric vehicles at a power greater than or equal to 50 kW.

19 Claims, 1 Drawing Sheet

(56)  References Cited

U.S. PATENT DOCUMENTS

| | | | |
|---|---|---|---|
| 2019/0176641 A1 | 6/2019 | Baek et al. | |
| 2019/0381906 A1* | 12/2019 | Giebel | B60L 55/00 |
| 2020/0122586 A1 | 4/2020 | Lu et al. | |
| 2021/0291670 A1 | 9/2021 | Kaufman et al. | |
| 2022/0219549 A1* | 7/2022 | Slepchenkov | B60L 58/21 |

OTHER PUBLICATIONS

Bahrami, Ali. "EV Charging Definitions, Modes, Levels, Communication Protocols and Applied Standards." Changes 1 (2020): 10-01.

* cited by examiner

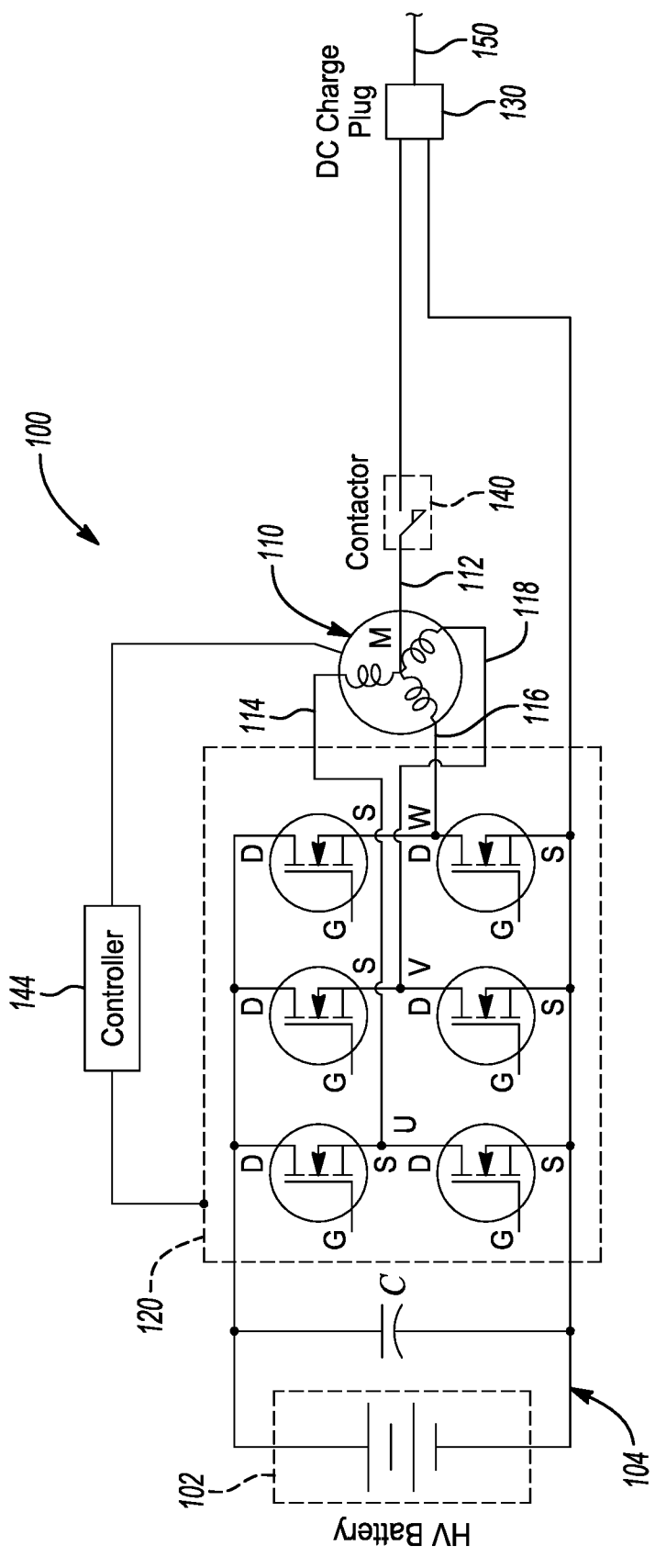

PEER-TO-PEER DC FAST CHARGING

TECHNICAL FIELD

The present disclosure relates to direct current ("DC") fast-charging systems. The fast-charging systems are capable of fast charging vehicles and electric devices. The fast-charging systems can be used to perform peer-to-peer fast charging.

BACKGROUND

Electric-powered vehicles such as battery electric vehicles ("BEVs") or hybrid-electric vehicles ("HEV") may be plugged in through a DC fast port to recharge depleted energy from an external power source, such as a charging station of a power grid system. However, power stations and power grid system may be fixedly located and not portable. Additionally, mobile charging systems may not provide a sufficient amount of power to recharge a vehicle in an acceptable amount of time.

SUMMARY

Embodiments disclosed herein relate to power systems with fast charging capability. Example power systems include a multi-phase motor having an electrically neutral connection; a DC charge plug; a traction battery electrically connected to a bus negative, the bus negative connected to the DC charge plug; a traction inverter electrically connected to the multi-phase motor via phase connectors, and electrically connected to the traction battery; a contactor electrically connected to the motor neutral connection and electrically connected to the DC charge plug; and a controller electrically connected to the multi-phase motor and the traction inverter, the controller being configured to control power by using motor inductance and inverter switching controls to either increase or decrease voltage at the DC charge plug. Example power systems disclosed herein are capable of charging vehicles or devices at a power level of greater than or equal to 50 kW. Example power systems disclosed herein may be a power system that powers an electric vehicle and be capable of fast charging a second electric vehicle at a power level of greater than or equal to 50 kW.

Example controllers of power systems disclosed herein comprise one or more processors and non-transitory memory storing instructions that when executed by the one or more processors perform a method comprising receiving an indication to put the power system in a charging mode, in response to receiving the indication, sending a signal to the contactor of the power system to create a connection between the electrically neutral connection and the contactor's connection to the DC charging plug, and placing the power system into the charging mode.

Example electric vehicles disclosed herein comprise a multi-phase motor having an electrically neutral connection, a direct current ("DC") charge plug, a traction battery electrically connected to a bus negative, the bus negative being connected to the DC charge plug, a traction inverter electrically connected to the multi-phase motor via phase connectors, and electrically connected to the traction battery, a contactor electrically connected to the motor neutral connection and electrically connected to the DC charge plug, and a controller electrically connected to the multi-phase motor and the traction inverter, the controller configured to control power by using motor inductance and inverter switching controls to either increase or decrease voltage at the DC charge plug wherein the electric vehicle is capable of charging a chargeable system connected to the DC charge plug at a power greater than or equal to 50 kW.

BRIEF DESCRIPTION OF THE DRAWINGS

FIG. 1 discloses an example power system in accordance with the present disclosure.

DETAILED DESCRIPTION

Embodiments of the present disclosure are described herein. It is to be understood, however, that the disclosed embodiments are merely examples and other embodiments can take various and alternative forms. The FIGURES are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art will understand, various features illustrated and described with reference to any one of the FIGURES can be combined with features illustrated in one or more other FIGURES to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the FIGURE, it is noted that a general-purpose processor may be temporarily enabled as a special purpose processor for the purpose of executing some or all of the exemplary methods shown by these FIGURES or described herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

FIG. 1 discloses an embodiment of a power system 100 electrically connected 150 to a second system (not shown). In some embodiments of the present disclosure, the second system is a chargeable system. The chargeable system may be an electric vehicle capable of being charged by the power system 100. In some embodiments, the chargeable system is an electric device capable of being charged by the power system 100. In some embodiments, the second system is a power source capable of charging the power system 100.

The power system 100 includes a multi-phase motor 110 having an electrically neutral connection 112; a DC charge plug 130; a traction battery 102 electrically connected to a bus negative 104, the bus negative 104 being connected to the DC charge plug 130; a traction inverter 120 electrically connected to the multi-phase motor 110 via phase connectors 114, 116, and 118, and electrically connected to the traction battery 102; a contactor 140 electrically connected to the motor neutral connection 112 and electrically connected to the DC charge plug 130; and a controller 144 electrically connected to the multi-phase motor 110 and the traction inverter 120, the controller 144 being programmed to control power by using motor inductance and inverter switching controls to either increase or decrease voltage at the DC charge plug 150.

The traction battery 102 stores and provides energy that many be used by the power system 100. The traction battery 102 may be a battery pack in some embodiments. The traction battery 102 may provide a high voltage DC output from one or more battery cell arrays, sometimes referred to as battery cell stacks, within the traction battery 102. The battery cell arrays may include one or more battery cells. The traction battery 102 is electrically connected to a bus negative 104, which is electrically connected to the DC charge plug 130.

In some embodiments, the DC charge plug 130 is a Combined Charging System ("CCS"). In some embodiments, the DC charge plug 130 is a Charge de Move ("CHAdeMO") plug. Other suitable fast charge connections, such as Supercharger or SAE Combo connectors, may be used in some embodiments to suit different applications.

The traction inverter 120 is electrically connected to the traction battery 102 and is also electrically connected to the multi-phase motor 110 via phase connectors 114, 116, and 118. The multi-phase motor 110 may be a three-phase motor as shown in FIG. 1. The multi-phase motor 110 includes an electrically neutral connection 112. The power system 100 includes a contactor 140 that is electrically connected to the electrically neutral connection 112 and electrically connected to the DC charge plug 130.

The power system 100 includes a controller 144 that is electrically connected to the traction inverter 120 and electrically connected to the multi-phase motor 110. The controller 144 may be configured to control power by using motor 110 inductance and inverter 120 switching controls to either increase/boost or decrease/buck voltage at the DC charge plug 130.

During operation of the power system 100, the controller 144 may be put into a charging mode. The charging mode may be either a supply mode or a load mode. In supply mode, the power system 100 can recharge a device or vehicle connected to the charge plug 130. In load mode, the power system 100 can be recharged by a power supply (e.g., a charging station, an electric vehicle, or other power source).

The power system 100 may receive an indication to be put into a charging mode (e.g., either a supply mode or a load mode). This indication may be provided by a user of the power system 100. For example, a user of a vehicle including the power system 100 may push a button or flip a lever on the vehicle (e.g., the vehicle dashboard) to send the indication to the controller 144 to put the power system 144 into either a supply mode or a load mode. In response to receiving an indication to put the power system 100 into a charging mode, the controller 144 may send a signal to the contactor 140 to close, creating a connection between the electrically neutral connection 112 and the contractor's 140 connection to the DC charging plug 130.

The power system 100 is placed into a charging mode when the contactor 140 creates a connection between the electrically neutral connection 112 and the contractor's 140 connection to the DC charging plug 130. When in a charging mode, the power system 100 behaves as a 4-quadrant DC-to-DC converter that may increase the voltage at the DC charge plug 130 (i.e., boost the voltage) or decrease the voltage at the power plug 130 (i.e., buck the voltage).

For example, the power system 100 may be operational at a different voltage than the device or vehicle to be recharged when the power system 100 is in supply mode. Similarly, the power system 100 may be operational at a different voltage than a power source (e.g., electrical device, vehicle, or recharging station) when the power system 100 is in load mode.

The controller 144 is configured to perform operations disclosed herein. In some embodiments, the controller is programmed to perform operations disclosed herein by executing computer-executable instructions on one or more processors. In some embodiments the controller 144 may include one or more computing devices such as a quad core processor for processing commands, such as a computer processor, microprocessor, or any other device, series of devices or other mechanisms capable of performing the operations discussed herein. The controller 144 may include memory (not shown) operable to store instructions and commands. The instructions may be in the form of software, firmware, computer code, or some combination thereof. The memory may be in any form of one or more data storage devices, such as volatile memory, non-volatile memory, electronic memory, magnetic memory, optical memory, or any other form of data storage device. The memory may be a non-transitory storage device.

The controller 144 may receive an indication as to whether to increase or decrease the voltage to or from the charge plug 130. This indication may be provided by a user of the power system 100. For example, a user of a vehicle including the power system 100 may push a button or flip a lever on the vehicle (e.g., the vehicle dashboard) to send the indication to the controller 144, indicating to the controller 144 it should boost or buck the voltage. Alternately, the indication may be provided as a result of a handshake that takes place when the device or vehicle is connected to the charge plug 130.

In some embodiments, the power system 100 is a power system for an electric vehicle. The electric vehicle may be a hybrid electric vehicle. A first electric vehicle including the power system 100 is capable of recharging a power system connected to the DC charge plug at a power greater than or equal to 50 kW. The recharged power system may be, for example, an electrical device or a vehicle.

In preferred embodiments, an electric vehicle including the power system 100 is capable of recharging a second electric vehicle at a power greater than or equal to 50 kW. Accordingly, an electric vehicle including the power system 100 is capable of fast charging a second electric vehicle. That is, an electric vehicle including the power system 100 is capable of peer-to-peer DC fast charging. As such, an electric vehicle including the power system 100 is capable of peer-to-peer fast charging of a second electric vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A power system comprising:
a multi-phase motor having an electrically neutral Connection;
a direct current ("DC") charge plug;
a traction battery electrically connected to a bus negative, the bus negative being connected to the DC charge plug;
a traction inverter electrically connected to the multi-phase motor via phase connectors, and electrically connected to the traction battery;
a contactor electrically connected to the motor neutral connection and electrically connected to the DC charge plug; and
a controller electrically connected to the multi-phase motor and the traction inverter, the controller configured to control power by using motor inductance and inverter switching controls to either increase or decrease voltage to the DC charge plug.

2. The power system of claim 1, wherein the power system is a power system for an electric vehicle ("EV").

3. The power system of claim 1, wherein the multi-phase motor is a three-phase motor.

4. The power system of claim 1, wherein the DC charge plug is a Combined Charging System ("CCS") connector or a Charge de Move ("CHAdeMO") plug.

5. The power system of claim 1, wherein the DC charge plug is connected to a chargeable system.

6. The power system of claim 5, wherein the power system is capable of charging the chargeable system at a power greater than or equal to 50 kW.

7. The power system of claim 5, wherein the chargeable system is an EV.

8. The power system of claim 1, wherein the DC charge plug is connected to a system capable of charging the power system.

9. The power system of claim 8, wherein the system capable of charging the power system is an EV.

10. A controller of a power system according to claim 1, comprising:
one or more processors; and
non-transitory memory storing instructions that when executed by the one or more processors perform a method comprising:
receiving an indication to put the power system in a charging mode; and
in response to receiving the indication, sending a signal to the contactor of the power system to create a connection between the electrically neutral connection and the contactor's connection to the DC charging plug, placing the power system into the charging mode.

11. The controller of claim 10, wherein the charging mode is a supply mode.

12. The controller of claim 10, wherein the charging mode is a load mode.

13. The controller of claim 10, wherein the method further comprises:
controlling power by increasing voltage at the DC charge plug.

14. The controller of claim 10, wherein the method further comprises:
controlling power by decreasing voltage at the DC charge plug.

15. An electric vehicle comprising:
a multi-phase motor having an electrically neutral connection;
a direct current ("DC") charge plug;
a traction inverter electrically connected to the multi-phase motor via phase connectors, and electrically connected to a traction battery; and
a controller electrically connected to the multi-phase motor and the traction inverter, the controller configured to control power by using motor inductance and inverter switching controls to either increase or decrease voltage at the DC charge plug, wherein the electric vehicle is configured to charge a chargeable system connected to the DC charge plug at a power up to a predetermined amount.

16. The electric vehicle of claim 15, wherein the multi-phase motor is a three-phase motor.

17. The electric vehicle of claim 15, wherein the electric vehicle is a hybrid electric vehicle.

18. The electric vehicle of claim 15, wherein the predetermined amount is equal to or greater than 50 kW.

19. The electric vehicle of claim 15, further comprising:
a traction battery electrically connected to a bus negative, the bus negative being connected to the DC charge plug; and a contactor electrically connected to the motor neutral connection and electrically connected to the DC charge plug.

\* \* \* \* \*